March 13, 1962 R. SUHRMANN 3,025,345

CIRCUIT ARRANGEMENT FOR AUTOMATIC READJUSTMENT OF THE BACKGROUND BRIGHTNESS AND THE CONTRAST IN A TELEVISION RECEIVER

Filed March 26, 1959 2 Sheets-Sheet 1

INVENTOR
ROBERT SUHRMANN

BY Frank R. Jifari
AGENT

March 13, 1962 R. SUHRMANN 3,025,345
CIRCUIT ARRANGEMENT FOR AUTOMATIC READJUSTMENT OF THE
BACKGROUND BRIGHTNESS AND THE CONTRAST
IN A TELEVISION RECEIVER
Filed March 26, 1959 2 Sheets-Sheet 2

INVENTOR
ROBERT SUHRMANN

BY
Frank R. Jifani
AGENT 3,025,345
Patented Mar. 13, 1962

1

3,025,345

CIRCUIT ARRANGEMENT FOR AUTOMATIC READJUSTMENT OF THE BACKGROUND BRIGHTNESS AND THE CONTRAST IN A TELEVISION RECEIVER

Robert Suhrmann, Hamburg-Rahlstedt, Germany, assignor to North American Philips Company, Inc., New York, N.Y., a corporation of Delaware Filed Mar. 26, 1959, Ser. No. 802,166
Claims priority, application Germany Apr. 29, 1958
6 Claims. (Cl. 178—7.5)

In order to simplify the control of a television receiver it has been proposed to adapt automatically the adjustment contrast to the variable room light with the aid of a photo-sensitive element and to keep constant the black level of the television image in accordance with the contrast. However, owing to the use of an auxiliary tube, this known arrangement is comparatively costly and has the disadvantage that a direct control of the background brightness in accordance with the room light is not obtained. In accordance with the invention it is possible, in a very simple manner, to obtain an automatic readjustment both of the background brightness and of the contrast in accordance with the room light, by deriving directly the voltage which determines the background brightness and the image signal amplification, i.e. the contrast voltage, from a direct voltage potentiometer which comprises a photo-sensitive resistor.

The invention will now be described more fully with reference to the embodiments shown in the drawing.

FIG. 1 shows the principle of a known arrangement for the control of the background brightness and of the contrast by manually actuated control members.

FIG. 2 serves for the explanation of the invention.

Figure 1:
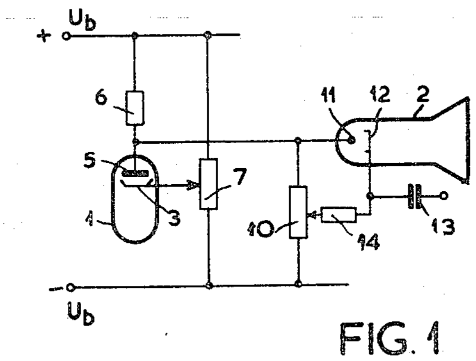

FIG. 1 shows only the arrangement in principle. Reference numeral 1 designates the video output tube and 2 the picture tube of a television receiver. The video signal at the anode resistor 6 is fed from the anode 5 of the tube 1 to the cathode 11 of the picture tube 2. By means of a potentiometer 7 the voltage at the screen grid 3 is controlled and hence also the contrast is adjusted. Between the cathode 11 of the picture tube and earth is connected a potentiometer 10, the sliding contact of which, connected to the control-grid 12 via a decoupling resistor 14 serves to adjust the background brightness. The blanking pulses are supplied via the capacitor 13.

Figure 2:
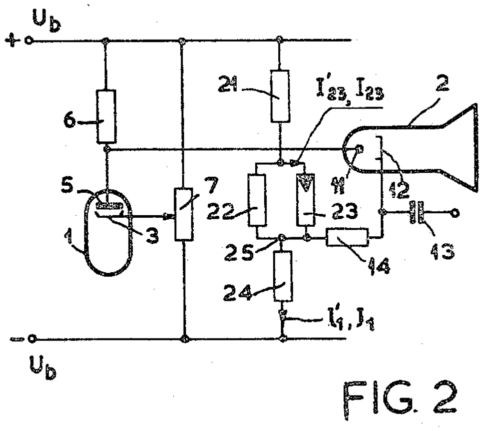

With reference to FIG. 2 will be first explained, for the sake of clarity, only the automatic readjustment of the background brightness in accordance with the invention.

The adaptation of the background brightness to the room light striking the picture screen takes place automatically by means of a potentiometer formed by the series resistor 21, the parallel combination of the resistor 22 and of the photo-sensitive resistor 23 and of the load resistor 24. The voltage which determines the background brightness is derived from the junction 25 and fed directly via the decoupling resistor 14 to the control-grid 12 of the picture tube 2.

The background brightness is controlled by varying the internal resistance of the photo-sensitive resistor upon exposure. Thus the current passing through the potentiometer and, at the same time, the voltage drop across the load resistor 24 vary. The variable voltage drop across the resistor 24 serves for the readjustment of the background brightness.

2

For the design of the potentiometer first two limit values of the exposure light intensity E and E′ are taken as a basis, from which the required voltages $U_{g1}$ and $U_{g1}'$ at the control-grid 12 of the picture tube 2 with respect to the desired background brightness are calculated. The supply voltage $U_b$ is known it is first calculated which maximum current $I_1'$ flows through the potentiometer at the maximum exposure intensity E′. If $I_1'$ is known, the value of the load resistor 24 is obtained from:

$$R_{24}=U_{g1}'/I_1'$$

From the characteristic curve of the photo-sensitive resistor 23, at the maximum exposure light intensity E′ and at a current $I_1'$, the voltage drop $U_{23}'$ across the photo-sensitive resistor is obtained, it being assumed that the resistor $R_{23}$, at the exposure intensity E′, has a low value with respect to the value of the parallel resistor 22 to be calculated. The value of the series resistor 21 is obtained from the relation:

$$R_{21}=\frac{U_b-(U_{g1}'+U_{23}')}{I_1'}$$

Thus two of the three resistors of the potentiometer are known.

By means of the minimum exposure light intensity E, of the voltage $U_{g1}$ and of the two, now known resistors 21 and 24, the value of the parallel resistor 22 can now be calculated. The current $I_1$ at an exposure intensity E is $I_1=U_{g1}/R_{24}$. From $I_1.R_{21}=U_{21}$ is obtained the voltage drop across the series resistor 21. Thus the voltage $U_{23}$ across the photo-sensitive resistor is known, since it is equal to $U_b-(U_{g1}+U_{21})$ it occurs at a minimum exposure intensity E. By means of $U_{23}$ and E is obtained from the characteristic curve of the photosensitive resistor the current $I_{23}$. Thus the current $I_{22}$ passing through the resistor 22 is known, since it is equal to $I_1-I_{23}$. Now all resistance values of the potentiometer are known and, moreover, the starting point and the final point of the control characteristic.

In an arrangement comprising a picture tube AW 43–80 and a photo-sensitive resistor ORP 30 (Philips), $U_b$ was 200 v., $U_{g1}'$ 149 v., E′ 300 luxes, $U_{g1}$ 138 v., at $E=7.5$ luxes. With a current $I_1'$ of 10 ma., $R_{21}$ was 4.75K ohms, $R_{22}$ 3.3K ohms and $R_{24}$ 14.9K ohms. With $I_1'=20$ ma., $R_{21}$ was 2.25K ohms, $R_{22}$ 1.42K ohms and $R_{24}$ 7.45K ohms.

The two control characteristic curves obtained on the basis of the said proportions exhibited also at the points between minimum and maximum room light a satisfactory approximation of a subjective curve, which was obtained by re-adjusting manually the background brightness between the extreme values of the room light so that the lines on the television picture were just perceptible. A further improvement in the adaptation of the automatically obtained control to the subjective control characteristic curve of the back-ground brightness may be obtained by including non-linear resistors, which will be explained hereinafter.

It is advantageous to control automatically not only the background brightness but also the contrast of the television image in accordance with the room light. For readjusting the contrast, in principle, various possibilities exist. The contrast of the television image may be kept constant irrespective of the room light, or the maximum light intensity may be fixed so that within the available range always the same number of grey scale steps can be obtained. Finally, as a maximum limit of the light intensity also this intensity may be chosen at which just no flickering occurs.

Figure 3:
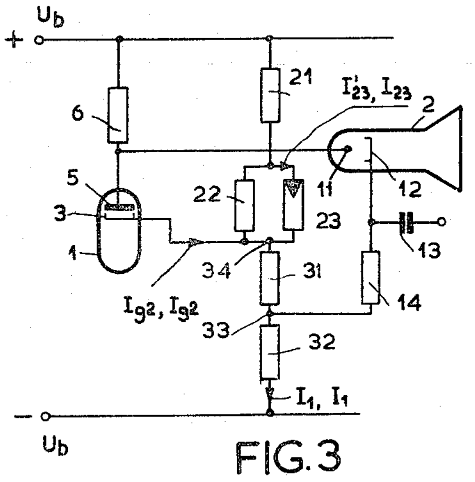
FIG. 3 shows one embodiment of the invention of an arrangement for automatic control of the background brightness and of the contrast.

FIG. 3 shows one embodiment of the invention in the form of an arrangement for automatic readjustment of the background brightness and of the contrast. The screen grid voltage of the video output tube, determining the contrast, is obtained, in accordance with the invention, directly from the potentiometer comprising the resistors 21, 22 31, 32 and the photo-sensitive resistor 33. The load resistor (24 of FIG. 2) is subdivided into the load resistors 31 and 32, from which the background brightness voltage occurring at the junction 33 is fed via the resistor 14 to the control grid 12 of the picture tube 2.

Since the screen grid voltage determining the contrast exceeds, in this case, the background brightness voltage, it is to be considered, when designing the arrangement, that there is an additional screen grid current passing through the potentiometer. The circuit elements can then be calculated from the known exposure light intensities E and E', the associated screen grid voltages $U_{g2}'$ and $U_{g2}$ for the contrast and the corresponding background brightness voltages $U_{g1}'$ and $U_{g1}$ as follows:

With the maximum exposure light intensity E' is first found, in accordance with the characteristic of the photo-sensitive resistor 23, the voltage $U_{23}'$ by assuming as known the maximum current $I'_1+I_{g2}'$.

$I_1'$ is chosen preferably to be ten times higher than $I_{g2}'$. Therefrom follows the value for the series combination of the resistors 31 and 32 ($R_{31}+R_{32}=U_{g2}'/I_1'$) and the value of the resistor $R_{21}$ is:

$$R_{21}=\frac{U_b-(U_{g2}'+U_{23}')}{I_1'+I_{g2}'}$$

wherein $I_{g2}'$ is the screen grid current at a screen grid voltage $U_{g2}'$. The value of the resistor 32, from which the voltage for re-adjustment of the background brightness is obtained, is:

$$R_{32}=U_{g1}'/I_1'$$

$R_{31}$ is therefore obtained without any further calculations, since the sum of $R_{31}+R_{32}$ is already known.

The calculation of the value of the resistor 22 is again possible by using the minimum exposure light intensity E and the voltage values $U_{g2}$ and $U_{g1}$ associated herewith. The current $I_1$ follows from the relation:

$$I_1=U_{g2}(R_{31}+R_{32})$$

Thus the voltage drop $U_{21}$ across the resistor 21 is obtained:

$$U_{21}=(I_1+I_{g2}).R_{21}$$

Herein $I_{g2}$ is the screen grid current associated with the screen grid voltage $U_{g2}$. Then across the photo-sensitive resistor prevails the voltage $U_{23}=U_b-(U_{g2}+U_{21})$. By means of the characteristic curve of the photo-sensitive resistor it follows for the values E and $U_{23}$ the current $I_{23}$. The parallel resistor 22 thus has a current $I_1+I_{g2}-I_{23}$. The value of this resistor is:

$$R_{22}=\frac{U_{23}}{I_1+I_{g2}-I_{23}}$$

Thus all values of the potentiometer resistors are known.

It should be noted that, when using ohmic resistors, the relation $U_{g2}'/U_{g2}$ must be equal to $U_{g1}'U_{g1}$.

In an arrangement comprising a picture AW 43–80, a photo-sensitive resistor ORP 30 (Philips) and a tube PL 83 as a video output tube, the starting values were $U_b$=170 v., $U_{g1}'$=32 v. and $U_{g2}'$=76 v. at $E'$=400 luxes; $U_{g1}$=23 v. and $U_{g2}$=54 v. at $E$=0.2 luxes. With a chosen current $I_1'+I_{g2}'$=10 ma., $R_{21}$ was 9.1K ohms, $R_{22}$ 7.4K ohms, $R_{31}$ 5.2K ohms and $R_{32}$ 3.8K ohms. The screen grid currents were $I_{g2}'$=1.5 ma. and $I_{g2}$=1.0 ma.

A comparison of the arrangement of FIG. 3 according to the invention with the known arrangement shown in FIG. 1 shows that the additional expenses for the automatic control are practically restricted to those of the photo-sensitive resistor.

Figure 4:
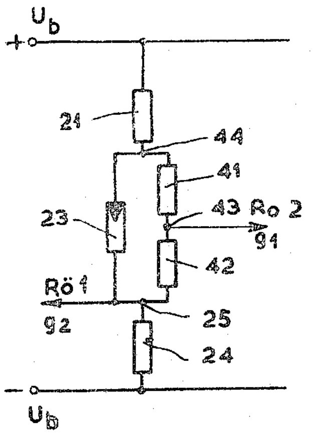
FIG. 4 shows a variant of the arrangement shown in FIG. 3.

FIG. 4 shows a further embodiment of the invention for the case in which the potential required for the adjustment of the background brightness exceeds the potential of the screen grid for the contrast control of the video output tube.

The resistor 22, which, as is shown in FIG. 3, is parallel with the photo-sensitive resistor 23, is replaced by a series combination of resistors 41 and 42, which constitute a second potentiometer. From the junction 43 of the resistors 41 and 42 is obtained the brightness potential, which does not constitute an additional load. The screen grid voltage for the contrast control of the video output tube is obtained from the resistor 24.

When the photo-sensitive resistor is exposed, the voltage at point 44 drops and that at point 25 rises. Between these points there is a point of constant voltage, so that the arrangement operates as a bridge circuit. Thus the division ratio of the potentiometer consisting of the resistors 41 and 42 determines the value and the polarity of the voltage variation during exposure. Otherwise the arrangement is designed as described above.

In an arrangement comprising a picture tube AW 43–80, a photo-sensitive resistor ORP 30 (Philips) and the pentode system of a tube PCL 84 as a video output tube, the following values were obtained:

$U_b$=200 v., $R_{21}$=3K ohms, $R_{41}$=8.7K ohms, $R_{42}$=8.3K ohms, $R_{24}$=16K ohms, the anode resistance of the video output tube was 3.9K ohms.

Figure 5:
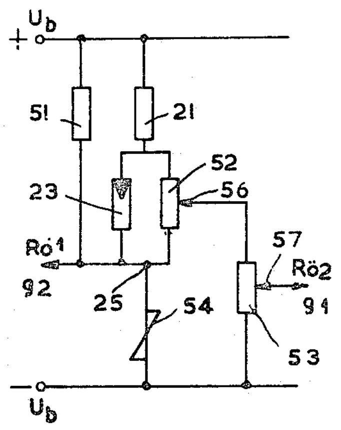
FIG. 5 shows a further embodiment of the invention.

FIG. 5 shows an embodiment of the invention in which the load resistor is replaced by a voltage-dependent resistor (VDR) 54. Thus a still better adaptation between the desired control variation and the practically obtainable control is achieved. This variant of the arrangement may also be used in the preceding embodiments. Between the terminal $U_b$ of the voltage source and the terminal 25 of the voltage-dependent resistor 54 is connected a resistor 51, which causes an additional current to flow through the resistor 54, this current serving for the stabilisation of the working point.

The voltage of the background brightness is obtained from the tapping 56 of the potentiometer 52 and fed to the potentiometer 53. The position of the tapping 56 determines again the value and the polarity of the variation of the voltage which determines the background brightness, whilst the absolute value of this voltage which may be higher or lower than the contrast voltage, is determined by the position of the tapping 57 of the potentiometer 53. When using a picture tube AW 43–80 and a video output tube PL 83, at a photo-sensitive resistor of 3 to 4K ohms and an exposure intensity of 200 luxes, the following values were obtained:

$U_b$=190 v., $R_{21}$=2.2K ohms, $R_{51}$=12K ohms, $R_{52}$=100K ohms, $R_{53}$=500K ohms, $R_{54}$=VD 1200 P/330 B (Philips).

Similar to the potentiometers 52 and 53 of FIG. 5, also the resistors from which control-voltages are taken in the preceding arrangements, may be constructed in the form of trimming potentiometers, so that the adjustment of the desired working point or the re-adjustment when the tubes exhibit ageing phenomena or in the case of replacement, is readily carried out.

It is advisable to use a photo-sensitive resistor, with the highest possible resistance for example of about 3 to 6K ohms with 300 luxes in order to have a low current through the potentiometer.

What is claimed is:

1. A circuit for automatically adjusting the background brightness of a television receiver in response to variations in light surrounding said receiver comprising an image reproducing device having an electrode responsive to voltage applied thereto to vary the brightness of a reproduced image, means providing a voltage variable with variations of said light comprising a source of voltage, and a potentiometer circuit connected to said source, said potentiometer circuit comprising the series combination of a first series resistor, a parallel combination of first and second parallel resistors, and a second series resistor, in the order named, said first series resistor being connected to the positive terminal of said source, said first parallel resistor being a photo-sensitive resistor and being exposed to said light, and means connecting said second series resistor to said electrode.

2. A circuit for automatically adjusting the background brightness and contrast of a television receiver in response to variations in light surrounding said receiver comprising an amplifying device having an input circuit, an output circuit, and a contrast control electrode responsive to voltage applied thereto to vary the signal amplification of said device, a source of video signals, means applying said video signals to said input circuit, an image reproducing device having a first electrode responsive to video signals to reproduce an image and a second electrode responsive to voltage applied thereto to vary the brightness of said image, means connecting said output circuit to said first electrode, a source of voltage having a positive terminal and a negative terminal, a potentiometer circuit connected between said positive and negative terminals comprising a first series resistor, a parallel combination of first and second parallel resistors, and second and third series resistors, in the order named, said first parallel resistor being a photosensitive resistor exposed to said light, means connecting the junction of said second and third series resistances to said second electrode, and means connecting the junction of said second series resistor and said parallel combination to said contrast control electrode.

3. A circuit for automatically adjusting the background brightness and contrast of a television receiver in response to variations in light surrounding said receiver comprising an amplifying device having an input circuit, an output circuit, and a contrast control electrode responsive to voltage applied thereto to vary the signal amplification of said device, a source of video signals, means applying said video signals to said input circuit, an image reproducing device having a first electrode responsive to video signals to reproduce an image and a second electrode responsive to voltage applied thereto to vary the brightness of said image, means connecting said output circuit to said first electrode, a source of voltage having a positive terminal and a negative terminal, a potentiometer circuit connected between said positive and negative terminals comprising a first series resistor, a parallel combination of first parallel resistor means and second parallel resistor means, and a second series resistor, in the order named, said first parallel resistor means comprising a photo-sensitive resistor exposed to said light, a tap on said second parallel resistor means, means connecting said tap to said second electrode, and means connecting the junction of said second series resistor and parallel combination to said contrast control electrode.

4. The circuit of claim 3, in which said second series resistor has voltage dependent resistance characteristics.

5. The circuit of claim 4, comprising a resistor connected between said positive terminal and said junction of said second series resistor and parallel combination.

6. A circuit for automatically adjusting the background brightness of a television receiver in response to variations in light surrounding said receiver comprising an image reproducing device having an electrode responsive to voltage applied thereto to vary the brightness of a reproduced image, means providing a voltage variable with variations of said light comprising a source of voltage having first and second terminals, and a potentiometer circuit comprising series resistance means connected between said first and second terminals and having at least first and second intermediate taps, photo-sensitive resistor means connected in parallel with the portion of said series resistance means between said first and second taps, and means connecting a point on said series resistance means intermediate the ends thereof to said electrode, said photo-sensitive resistor means being exposed to said light.

References Cited in the file of this patent

UNITED STATES PATENTS 2,264,172 Batchelor ---------------- Nov. 25, 1941